United States Patent Office 3,045,053
Patented July 17, 1962

3,045,053
PREPARATION OF MERCAPTANS AND SULFIDES
Fred A. Ford, Texas City, Tex., assignor, by mesne assignments, to Standard Oil Company, Chicago, Ill., a corporation of Indiana
No Drawing. Filed Mar. 30, 1959, Ser. No. 802,649
15 Claims. (Cl. 260—609)

This invention relates to a new method of preparing mercaptans and/or sulfides, and more particularly concerns a process for directly reacting an olefinically unsaturated compound with hydrogen sulfide to produce either or both of the indicated products.

Organic mercaptans and sulfides, particularly the primary alkyl mercaptans of higher molecular weight, are exceedingly valuable as chain transfer agents or modifiers in the preparation of synthetic rubber and other synthetic organic polymers. However, despite this demand, mercaptans and sulfides have remained difficult and costly to prepare in commercial quantities. One route to the primary mercaptans is the reaction of a primary alkyl halide with sodium hydrosulfide to form the corresponding primary alkyl mercaptan, or thiol, and sodium chloride. Another method is the reaction of an alcohol with hydrogen sulfide over thoria to obtain the corresponding mercaptan plus water. Both of these methods require costly raw materials (alkyl halides or higher molecular weight alcohols) and can only be used in preparing mercaptan analogs of the corresponding alkyl halide or alcohol. Although the direct free-radical-initiated addition of hydrogen sulfide ($H_2S$) to olefins is well known, various processes employing this reaction have not hitherto been commercially attractive. Furthermore, many embodiments of free-radical initiated reactions require that a water phase be present during the reaction; this becomes acidic during the reaction and is highly corrosive. Accordingly, a primary object of the present invention is to provide a low-cost convenient method for preparing organic mercaptans and sulfides in high, commercially attractive yields by the direct addition of hydrogen sulfide to readily available olefinic charging stocks.

It has now been discovered, in accordance with the invention, that hydrogen sulfide reacts with olefinically unsaturated compounds to form a mixture of the corresponding mercaptan and sulfide if the reaction is carried out in the conjoint presence of an organic peroxide and at least one elemental metal in Group VIII of the Fourth Period of the Mendelyeev Periodic Table. These metals are iron, cobalt, and nickel, or their alloys or physical admixtures with each other. The addition of hydrogen sulfide to olefins in accordance with the present invention appears to be of the anti-Markownikoff type, and as a consequence the sulfhydryl or mercaptyl radical adds to that carbon atom which has the largest number of hydrogen atoms directly attached to it.

A wide variety of olefinically unsaturated organic compounds, i.e. those which have one or more ethylenic double bonds, may be reacted with hydrogen sulfide in accordance with the invention. Suitable charging stocks comprise ethylene, propylene, butene-1, butene-2, isobutylene, pentene-1, heptene-1, octene-1, dodecene-1, tetradecene-1, hexadecene-1, or their mixtures, or other alkenyl hydrocarbons. Examples of isoalkenyl compounds suitable for use herewith include 3-methyl butene, 4-methyl pentene, 5-methyl hexene, or their mixtures with each other. Aryl olefins may also be used, and are exemplified by styrene, alpha-methyl styrene, etc. Suitable diolefins (dienes), which may be reacted to form dimercaptans and olefinically unsaturated mercaptans, include butadiene, piperylene, isoprene, etc., or their admixtures with alkenes; cyclic olefins, such as cyclopentene, methyl cyclopentenes, cyclopentadienes, di-cyclopentadienes, etc.; substituted compounds of the foregoing, such as tetrafluorethylene, perfluorovinyl chloride, 3-chlorostyrene, or the like. Miscellaneous charging stocks which can be reacted by the process of this invention include norbornylene, 4-vinylcyclohexene, vinylcyclohexane, or the like.

In general, the present process would appear to find its greatest current utility in the conversion of higher boiling 1-alkenes, or alpha olefins, having from 4 to about 20 carbon atoms per molecule to primary alkyl mercaptans. The resulting mercaptans are exceedingly valuable modifiers in GRS or butadiene-styrene co-polymerizations as they produce a very homogenous polymer of high molecular weight (Can. J. Res., 25, 2, March 1947, pages 159–182). The organic sulfides which are obtained as a co-product of the inventive reaction may be converted to mercaptans by known techniques.

The olefin charging stock may contain unreactive diluents such as saturated hydrocarbons of similar or identical boiling range, for example, as in alkenes or their mixtures derived from petroleum refining operations.

A wide variety of organic peroxides may be employed. It has been discovered that the tertiary-alkyl peroxides especially the di-tert-alkyl peroxides such as ditertiary butyl peroxide, or cumene hydroperoxide, are outstanding free radical initiators for the present reaction. A considerable variety of suitable peroxides is listed in the chapter on peroxides in Kirk and Othmer, "Encyclopedia of Chemical Technology," and include: alkyl hydroperoxides such as methyl hydroperoxide, cumene hydroperoxide, 1-tetralyl hydroperoxide, t-butyl hydroperoxide, isopropyl hydroperoxide, and alpha-dimethyl-p-isopropylbenzyl hydroperoxide; dialkyl peroxides and cycloperoxenes such as di-n-propyl peroxide and ascaridole; acetylene peroxides, and hydroperoxides such as 3-methyl-3-hydroperoxy-1-butyne; hydroxyalkyl hydroperoxides and bis (hydroxyalkyl) peroxides such as methyl hydroxymethyl peroxide; alpha-hydroperoxy ethers and alpha-hydroperoxy ketones such as 1-hydroxyethyl hydroperoxide; oxydialkyl peroxides such as the oxy peroxide of furan; diacyl peroxides such as acetyl peroxide; acyl hydroperoxides such as peroxyformic acid; peroxy esters such as t-butyl peroxyacetate; polymeric peroxides, etc.

Organic peroxides and the metal may each be used in amounts ranging from about 0.001 to about 10 weight percent or higher on olefins.

The other essential ingredient of the inventive initiator system is an elemental metal selected from the Group VIII of the Fourth Period of the Mendelyeev Periodic Table. These metals are iron, cobalt, nickel, and their alloys and physical mixtures. It has been found essential that the metal must be in an elemental form, since bound forms of the various metals such as ferrous sulfide or ferric oxide are substantially inert. In addition, the elemental metal must be in an "active" state whereby it can react with and be corroded by hydrogen sulfide; stainless steel, for example of the type 316 variety, is evidently inactive due to its resistance to $H_2S$ corrosion and hence is not a suitable component. The elemental metal is preferably used in finely divided form, such as wire, wool (e.g. steel wool), shredded carbon steel, or extended on a suitable inert support material such as alumina or silica-alumina having a surface area in excess of 1 square meter per gram. Elemental metals which are extended on these high surface area supports are especially valued since they demonstrate an outstanding ability to remain active over long periods of use. The metal may be present in concentration of 1–5% of support.

A very wide range of reaction conditions may be employed. Ordinarily, the reaction is conducted at super-atmospheric pressure and temperature, although pressures as low as atmospheric and temperatures from about 50° F. may be employed if a suitably vigorous free radial initiator is used. The desired reaction conditions, however, are a pressure within the range of about 100 and 10,000 lbs. per square inch gage (p.s.i.g.), and a temperature from 150 to 600° F. Optimum conditions appear to be a pressure from 500 to about 2,000 p.s.i.g. and a temperature of from 200 to 500° F., most desirably from about 300 to about 350° F., which strikes a balance between cost of equipment for higher pressures and temperatures, with the need for maintaining long residence times when using lower pressures and temperatures. The reaction time may range from a few minutes up to twenty or more hours, although commercially attractive reaction times are from about 10 minutes to about 10 hours. When used according to the preferred embodiments, the elemental metals remain active for several days, and can be regenerated by roasting to the oxide and subsequent reduction with, for example, hydrogen gas. The catalyst is desirably disposed in a plurality of tubes in one or more reactors.

As employed in the reaction, the hydrogen sulfide is preferably maintained in molar excess over the olefin. For example, a molar ratio of $H_2S$/olefin ranging from about 0.01 to about 10 or more may be used, although a ratio of from about 2 to about 5 is preferred.

Although the inventive process can be carried out in the presence of a free water phase, it is a special advantage of the instant process that it can be carried out without such phase and can even be carried out in the substantial absence of any water whatsoever. In point of fact, accelerated conversion rates are obtained under substantially anhydrous conditions (which may be defined as operating with an olefin feed being no more than saturated with water at 60° F. and a hydrogen sulfide stream containing less than 1% water). Thus equipment corrosion caused by the presence of $H_2S$ and water is substantially completely avoided.

The reaction mixture, ordinarily obtained as a vapor from the reactor, may be treated to separate the desired product, which may be either mercaptan or sulfide. This is conveniently accomplished by cooling the mixture and flashing the cooled mixture to separate unreacted hydrogen sulfide for recycle and at least a portion of any low molecular weight olefin charge from the mixture. The liquid residue, or flash unit bottoms, may then be distilled either continuously or batchwise to separate the lower boiling mercaptan product from the higher boiling sulfide product.

Several illustrative embodiments of the inventive process are set forth in the numbered examples hereinafter displayed. It is to be understood that these are illustrative only and are not to be considered definitive with respect to scope or conditions.

*Example 1*

In this example, hydrogen sulfide was added to butene-1 in the presence of a peroxide initiator and iron filings.

Ninety-five percent pure butene-1 in the amount of 4.1 mols, together with 3.2 mols of hydrogen sulfide per mol of olefin, and 1.3 wt. percent on olefin of di-tert-butyl peroxide and 25 grams of iron filings were reacted in a type 316 stainless steel reactor at 315° F. for 60 minutes at a maximum pressure of 1725 p.s.i.g. At the end of this time, it was found that 272.0 grams of liquid product had been obtained, of which 67.9% was a butane thiol and 32.2% was a sulfide. The molar butene-1 conversion was 78.1%.

*Example 2*

In this example, hydrogen sulfide was added to butene-1 in the presence of a peroxide initiator and cobalt powder. With the exception of using cobalt in place of iron, and conducting the reaction at a maximum pressure of 1800 p.s.i.g., reaction conditions were identical with those of Example 1. At the end of reaction, 259.0 grams of liquid product was obtained, of which 68.0 wt. percent was a butane thiol and 32.0% a sulfide. The butene conversion was 78.5 mol percent.

*Example 3*

In this example, hydrogen sulfide was added to butene-1 in the presence of a peroxide initiator and nickel powder.

Reaction conditions duplicated those used in Example 1, except that 25 grams of nickel powder was substituted for the iron filings, and the maximum pressure was 2200 p.s.i.g. The resultant liquid product weighed 265.2 grams, of which 66.5 wt. percent was a butane thiol and 33.5 was a sulfide. The molar butene-1 conversion was 75.8%.

By contrast, when the reaction was repeated with the exception that all metals were eliminated, even operation at a pressure in excess of 3,000 p.s.i.g. failed to give results approaching those obtained in the above three examples. The total liquid product in this case weighed 139.8 grams, of which 68.8% was thiol and 31.2% was sulfide. The molar butene-1 conversion was only 41.6%, or about half that realized with a metal present.

*Example 4*

In this example, hydrogen sulfide was added to butene-1 in the presence of a peroxide initiator and carbon steel turnings. A free water phase was present during the reaction.

Reaction conditions duplicated those employed in Example 1, save that the final pressure was 1500 p.s.i.g. and 25 grams of carbon steel turnings was substituted for the iron filings. The resultant liquid product weighed 275 grams, representing a butene-1 conversion of 88 mol percent.

*Example 5*

In this example, hydrogen sulfide was added to butene-1 in the presence of a peroxide initiator and ordinary steel wool.

Reaction conditions duplicated those of Example 1, except 25 grams of commercial steel wool was substituted for the iron filings, and the final pressure was 1450 p.s.i.g. A free water phase was present during the reaction. At the conclusion, 322 grams of liquid product was recovered, representing a butene-1 conversion of 97 mol percent.

To demonstrate that the catalytic agent is metallic iron, this example was duplicated with the substitution of 25 grams of iron sulfide (FeS powder) for steel wool. The reaction was conducted at a final pressure of 2300 p.s.i.g. Only 138 grams of liquid product was recovered for a molar butene conversion of 37.5%.

*Example 6*

In this example, hydrogen sulfide was added to butene-1 in the presence of steel wool and a peroxide initiator, and it was demonstrated that free water is not essential to the inventive reaction.

The reaction was conducted by charging 3.88 mols of butene-1 and 3.2 mols of hydrogen sulfide per mol of butene-1, together with 3.0 grams of di-tert-butyl peroxide to 25 grams of steel wool in a stainless steel reactor at 1500 p.s.i.g. for 60 minutes. None of the charge components contained water. At the end of this time, 309 grams of liquid product was recovered, representing a butene-1 conversion of 94 mol percent. The liquid product, based on mol percent of butene-1 conversion, was 52.4% normal butyl thiol, 9.2% secondary butyl thiol, and 38.4% di-n-butyl sulfide.

*Example 7*

In this example, hydrogen sulfide was added to butene-1 in the presence of a peroxide initiator, using a carbon steel reactor and no additional metal.

The conditions essentially duplicated those in Examples 1 through 6, except that a carbon steel reactor was employed in lieu of the type 316 stainless steel vessel used in the above examples. A yield of 204 grams of liquid product was recovered for a butene-1 conversion of 56 mol percent.

A repetition of the above example was conducted, except that hydrogen iodide was added to "activate" the carbon steel vessel. With 2.0 grams of HI (47–50 wt. percent), the liquid product recovery was 257 grams, or a molar butene conversion of 72%.

*Example 8*

In this example, hydrogen sulfide was added to 2,5-dimethyl-2,4-hexadiene to produce a mixture of 2,5-dimethyl-2-hexene-4-thiol and 2,5-dimethyl-3,4-hexane dithiol.

Hydrogen sulfide, in the amount of 320 grams, was reacted with 2,5-dimethyl-2,4-hexadiene (200 grams) in the presence of 50 grams of water, three grams of di-tert-butyl peroxide and 12 grams of iron filings. The reaction was conducted in a carbon steel reactor at 250° F. and about 1,000 p.s.i.g. for twelve hours. At the end of this time, product was withdrawn from the reactor and consisted of an aqueous layer and a non-aqueous layer. This non-aqueous layer was fractionally distilled at 10 millimeters mercury absolute pressure through a 15-plate column to obtain 45.7 grams of 2,5-dimethyl-2-hexene-4-thiol and 49.7 grams of 2,5-dimethyl-3,4-hexane dithiol.

*Example 9*

In this example, hydrogen sulfide was added to dicyclopentadiene to produce an x-mercapto-y-3a,4,7,7a-pentahydro-4,7-methanoindene, a novel composition not hitherto obtainable.

Hydrogen sulfide, 399 grams, was reacted with 396 grams of dicyclopentadiene in the presence of 50 grams of water, three grams of di-tert-butyl peroxide and 12.5 grams of iron filings. The reaction was conducted in a carbon steel reactor at about 1,000 p.s.i.g., and 250° F., for ten hours. The products were an aqueous layer and a non-aqueous layer, which latter was distilled at 3 millimeters mercury pressure absolute through a 15-plate column. The product, an x-mercapto-y-3a,4,7,7a-pentahydro-4,7-methanoindene, was obtained as a water white liquid in the amount of 150 grams.

*Example 10*

In this example, hydrogen sulfide was added to alpha-methyl styrene in the presence of a peroxide initiator and steel wool.

These runs were made at 315° F. for one hour, using 3.2 mols $H_2S$/mole olefin and about 0.5 mol percent di-tert-butyl peroxide with 25 grams of steel wool. At the end of reaction, the reaction mixture was analyzed and found to comprise 42.9 mol percent conversion to 2-phenyl propane thiol and sulfides.

By contrast, a duplicate run conducted without steel wool gave only 39.7 mol percent conversion to 2-phenyl propane thiol and sulfides.

*Example 11*

In this example, hydrogen sulfide was added to hexene-1 in the presence of a peroxide initiator and steel wool.

3.0 mols of hexene-1, together with 3.2 mols of hydrogen sulfide per mole of hexene-1 and 1.3 wet. percent on olefin of di-tert-butyl peroxide, together with 25 grams of steel wool were reacted at 315° F. and 1200 p.s.i.g for one hour. At the end of this time it was found that 88.2 mol percent of the olefin had been converted to yield a mixture of 81.1 wt. percent on olefin charged of hexene thiol and 36.4 wt. percent on olefin of total sulfides.

*Example 12*

In this example, octene-1 was reacted with hydrogen sulfide in the presence of a peroxide initiator and steel wool.

Reaction conditions duplicate those employed in Example 11, save for the substitution of octene-1 as the reactive olefin. 88.2 mol percent of olefin was converted, and the yield was 54.2% of total octane thiol based on olefin charged, and 53.5 wt. percent of total sulfides on the same basis.

*Example 13*

In this example, hydrogen sulfide was added to butene-1 in a continuous process, using di-tert-butyl peroxide as inititiator and steel wool.

The flow reactor was a type 316 stainless steel vessel having a volume of about 600 cc. Butene-1 was admixed with hydrogen sulfide in a proportion of 3.2 mols $H_2S$/mol butene-1, and the mixture continuously pumped into the reactor at about 1500 p.s.i.g. Immediately before the charge entered the reactor, 1.3 wt. percent on butene-1 of peroxide initiator was introduced into the charge stream. The reactor contained about 150 grams of steel wool. After an average residence time of about 60 minutes at 300° F., the product was withdrawn and subjected to batch distillation to flash off excess hydrogen sulfide and resolve the liquid product into its individual components. Secondary butyl mercaptan distills off at 185° F., while the 185–209° F. cut is the desired normal butyl mercaptan (butanethiol-1). The bottoms represents dibutyl sulfide. In this run, 91.0 mol percent of butene-1 was converted, and 41.5 mol percent of the liquid product was normal butyl mercaptan, while 8.5% was secondary butyl mercaptan. Dibutyl sulfide represented 50.0 mol percent of the liquid product. The catalyst remained active for 4 days (100 hours).

From the above presentation, it is manifest that the inventive process provides an outstanding method of preparing mercaptans and sulfides by directly combining an olefinically unsaturated compound with hydrogen sulfide. The process herein disclosed is exceedingly versatile and can be employed for preparing mercaptans and sulfides from a wide variety of readily available reactant compounds. Furthermore, the process makes available commercial quantities of low-cost higher molecular weight ($C_4$ and higher) mercaptans and sulfides.

I claim:

1. In a process for reacting an olefinically unsaturated compound with hydrogen sulfide, the improvement which comprises carrying out said reaction in the conjoint presence of an organic peroxide and at least one finely divided elemental metal in Group VIII of the Fourth Period of the Mendelyeev Period Table.

2. Process of claim 1 wherein said olefinically unsaturated compound is an alpha olefinic hydrocarbon having from 4 to 20 carbon atoms per molecule.

3. Process of claim 2 wherein said hydrocarbon is butene-1.

4. Process of claim 2 wherein said hydrocarbon is hexene-1.

5. Process of claim 2 wherein said hydrocarbon is octene-1.

6. Process of claim 2 wherein said hydrocarbon is alpha-methyl styrene.

7. Process of claim 1 wherein said peroxide is di-tert-butyl peroxide.

8. Process of claim 1 wherein said metal is a metal wool.

9. Process of claim 1 wherein said metal is a metal powder.

10. Process of claim 1 wherein said metal is extended on an inert high surface area support.

11. Process of claim 1 wherein said metal is iron.

12. Process of claim 1 wherein said metal is cobalt.

13. Process of claim 1 wherein said metal is nickel.

14. A process for preparing a mercaptan which comprises reacting an olefinically unsaturated hydrocarbon with hydrogen sulfide at a reaction temperature of about 200 to about 500° F. and at a pressure of between about 500 and about 2,000 p.s.i.g. in the conjoint presence of an organic peroxide and at least one finely divided elemental metal in Group VIII of the Fourth Period of the Mendelyeev Periodic Table, and recovering the resultant mercaptan from the resulting reaction mixture.

15. A process for preparing a sulfide which comprises reacting an olefinically unsaturated hydrocarbon with hydrogen sulfide at a reaction temperature within the range of about 200 to about 500° F. and a pressure of from about 500 to about 2,000 p.s.i.g., carrying out said reaction in the conjoint presence of an organic peroxide and at least one finely divided elemental metal in Group VIII of the Fourth Period of the Mendelyeev Periodic Table, and recovering the resultant sulfide from the resulting reaction mixture.

References Cited in the file of this patent

UNITED STATES PATENTS

| | | |
|---|---|---|
| 2,052,268 | Williams et al. | Aug. 25, 1936 |
| 2,551,813 | Pinkney | May 8, 1951 |
| 2,865,965 | May et al. | Dec. 23, 1958 |

OTHER REFERENCES

Duffy et al.: Ind. Eng. Chem. 26, 91–93 (1934).
Vaughan et al.: J. Org. Chem. 7, 472–476 (1942).